United States Patent
Lian et al.

(10) Patent No.: US 10,272,942 B2
(45) Date of Patent: Apr. 30, 2019

(54) AUXILIARY STEERING SYSTEM AND AUXILIARY STEERING METHOD FOR ELECTRIC VEHICLE AND ELECTRIC VEHICLE

(71) Applicant: BYD COMPANY LIMITED, Shenzhen, Guangdong (CN)

(72) Inventors: Yubo Lian, Shenzhen (CN); Heping Ling, Shenzhen (CN); Fanliang Meng, Shenzhen (CN); Ting Wen, Shenzhen (CN); Yanfei Xiong, Shenzhen (CN)

(73) Assignee: BYD COMPANY LIMITED (CN)

( * ) Notice: Subject to any disclaimer, the term of this patent is extended or adjusted under 35 U.S.C. 154(b) by 0 days.

(21) Appl. No.: 15/753,122

(22) PCT Filed: Aug. 17, 2016

(86) PCT No.: PCT/CN2016/095706
§ 371 (c)(1),
(2) Date: Feb. 15, 2018

(87) PCT Pub. No.: WO2017/028788
PCT Pub. Date: Feb. 23, 2017

(65) Prior Publication Data
US 2018/0237059 A1    Aug. 23, 2018

(30) Foreign Application Priority Data

Aug. 17, 2015  (CN) .......................... 2015 1 0505423

(51) Int. Cl.
*A01B 69/00*    (2006.01)
*B62D 6/00*    (2006.01)
(Continued)

(52) U.S. Cl.
CPC ........ *B62D 5/0484* (2013.01); *B60T 8/17552* (2013.01); *B62D 5/0418* (2013.01);
(Continued)

(58) Field of Classification Search
CPC .. B62D 5/0481; B62D 5/0463; B62D 5/0484; B62D 5/0418; B62D 9/005; B62D 11/003; B62D 15/025; B60T 8/17552
(Continued)

(56) References Cited

U.S. PATENT DOCUMENTS

| | | |
|---|---|---|
| 5,299,650 A | 4/1994 | Wada et al. |
| 5,341,891 A | 8/1994 | Wada et al. |

(Continued)

FOREIGN PATENT DOCUMENTS

| | | |
|---|---|---|
| CN | 2747128 Y | 12/2005 |
| CN | 1911706 A | 2/2007 |

(Continued)

OTHER PUBLICATIONS

English Translation for CN103187708A.*
International Search Report from CN/2016/095706 dated Nov. 18, 2016 (2 pages).

*Primary Examiner* — Mahmoud S Ismail
(74) *Attorney, Agent, or Firm* — Calfee, Halter & Griswold LLP

(57) ABSTRACT

An auxiliary steering system (100) and method for an electric vehicle and the electric vehicle are disclosed. The system includes a detection component (6A) including a first electric motor (4) and a detection controller (6) configured to determine whether a steering assist device (2) is normal, to continue to determine whether the steering assist device (2) is normal if yes, and to control a drive rack (5A) of the first electric motor (4) to drive wheels (17) of the electric vehicle to return and to output a steering failure signal, a steering wheel torque signal and a direction signal if no; an electric motor controller (8); a second electric motor (14); and a vehicle controller (7). The electric motor controller (8) is further configured to control the second electric motor (14) to increase a drive torque for an outer front wheel (17), (Continued)

to brake an inner rear wheel (17), and to stop driving an inner front wheel (17) and an outer rear wheel (17).

20 Claims, 6 Drawing Sheets

(51) Int. Cl.
 *B62D 11/00*  (2006.01)
 *B62D 12/00*  (2006.01)
 *B63G 8/20*  (2006.01)
 *B63H 25/04*  (2006.01)
 *G05D 1/00*  (2006.01)
 *G06F 7/00*  (2006.01)
 *G06F 17/00*  (2019.01)
 *G06F 19/00*  (2018.01)
 *B62D 5/04*  (2006.01)
 *B62D 9/00*  (2006.01)
 *B60T 8/1755*  (2006.01)
 *B62D 15/02*  (2006.01)

(52) U.S. Cl.
 CPC ........... *B62D 5/0481* (2013.01); *B62D 9/005* (2013.01); *B62D 11/003* (2013.01); *B62D 15/025* (2013.01); *B62D 5/0463* (2013.01); *Y02T 10/7258* (2013.01)

(58) Field of Classification Search
 USPC .......................................................... 701/41
 See application file for complete search history.

(56) References Cited

U.S. PATENT DOCUMENTS

| | | | |
|---|---|---|---|
| 9,199,667 B2 | 12/2015 | Di Cairano et al. | |
| 2004/0016594 A1 | 1/2004 | Yasui et al. | |
| 2016/0159390 A1* | 6/2016 | Tamaizumi | B62D 5/0463 |
| | | | 701/41 |
| 2018/0354551 A1* | 12/2018 | Blond | B62D 5/0481 |

FOREIGN PATENT DOCUMENTS

| | | | |
|---|---|---|---|
| CN | 1962339 A | | 5/2007 |
| CN | 103187708 A | * | 7/2013 |
| CN | 103187708 A | | 7/2013 |
| DE | 19935030 A1 | | 2/2000 |
| EP | 1357007 A2 | | 10/2003 |
| JP | 2001354020 A | | 12/2001 |

\* cited by examiner

AUXILIARY STEERING SYSTEM AND AUXILIARY STEERING METHOD FOR ELECTRIC VEHICLE AND ELECTRIC VEHICLE

REFERENCE TO RELATED APPLICATION

The present application is based on International Application No. PCT/CN2016/095706, filed on Aug. 17, 2016, which claims benefits of the priority of Chinese Application No. 201510505423.3, filed on Aug. 17, 2015, the entire contents of which are herein incorporated by reference.

BACKGROUND

Technical Field

The present invention relates to the field of vehicles, and more specifically, to an auxiliary steering system for an electric vehicle and an auxiliary steering method for an electric vehicle.

Related Art

With the development of living standards of people, vehicles are widely used as transportation tools. Therefore, driving safety of the vehicles cannot be ignored. For conventional passenger vehicles, a steering system is indispensable currently.

The conventional steering system includes a steering assisting device, making it easy for a driver to turn a steering wheel. However, when the conventional steering system becomes abnormal (for example, encounters a failure) and cannot provide assistance, the driver cannot turn the steering wheel or needs to take great effort to turn the steering wheel. In this case, accidents extremely easily occur. In addition, the conventional steering system has complex mechanical connections, leading to a slow response speed and an undesirable control effect.

SUMMARY

The present invention is intended to resolve at least one of the technical problems in the prior art. In view of this, the present invention needs to provide an auxiliary steering system for an electric vehicle and an auxiliary steering method for an electric vehicle.

An auxiliary steering system for an electric vehicle is provided. The electric vehicle includes a motor controller and a motor. The auxiliary steering system includes: a detecting circuit, including a detection controller and an aligning motor, where the detection controller is used to: detect whether a steering assisting device is normal; and when the steering assisting device is abnormal, control a drive rack of the aligning motor to drive wheels of the vehicle to align, and send a steering malfunction signal, a steering wheel torque signal, and a direction signal; or when the steering assisting device is normal, continue to detect whether the steering assisting device is normal; and a vehicle controller, used to control, by using the motor controller according to the steering malfunction signal, the steering wheel torque signal, and the direction signal, the motor to increase a drive torque of an outer front wheel of the vehicle, brake an inner rear wheel of the vehicle, and stop driving an inner front wheel and an outer rear wheel of the vehicle.

In the foregoing auxiliary steering system, when the detection controller detects that the steering assisting device is abnormal, the vehicle controller is capable of controlling, by using the motor controller, the motor to perform corresponding actions on the wheels of the vehicle, to keep normal steering of the vehicle, thereby ensuring safety of the vehicle. At the same time, the foregoing auxiliary steering system performs steering control on the wheels of the vehicle by using the motor. Therefore, a steering control response time is shorter.

A steering method for preventing an electric vehicle from a steering malfunction is provided, including the following steps:

detecting whether a steering assisting device of the electric vehicle is normal; and when the steering assisting device of the electric vehicle is normal, continuing to perform the step of detecting whether a steering assisting device of the electric vehicle is normal; or when the steering assisting device of the electric vehicle is abnormal, controlling a drive rack of an aligning motor of the electric vehicle to drive wheels of the electric vehicle to align, and sending a steering malfunction signal, a steering wheel torque signal, and a direction signal; and controlling, by using the motor controller according to the steering malfunction signal, the steering wheel torque signal, and the direction signal, the motor to increase a drive torque of an outer front wheel of the vehicle, brake an inner rear wheel of the vehicle, and stop driving an inner front wheel and an outer rear wheel of the vehicle.

An electric vehicle is provided, including the auxiliary steering system for an electric vehicle described in the foregoing embodiment.

Additional aspects and advantages of the invention will partly be presented in the following descriptions, and partly become apparent in the following descriptions or be appreciated in practicing of the present invention.

BRIEF DESCRIPTION OF THE DRAWINGS

The foregoing and/or additional aspects and advantages of the present invention will become apparent and readily understood in the following descriptions of the embodiments with reference to the accompanying drawings in which.

DETAILED DESCRIPTION

Figure 1:
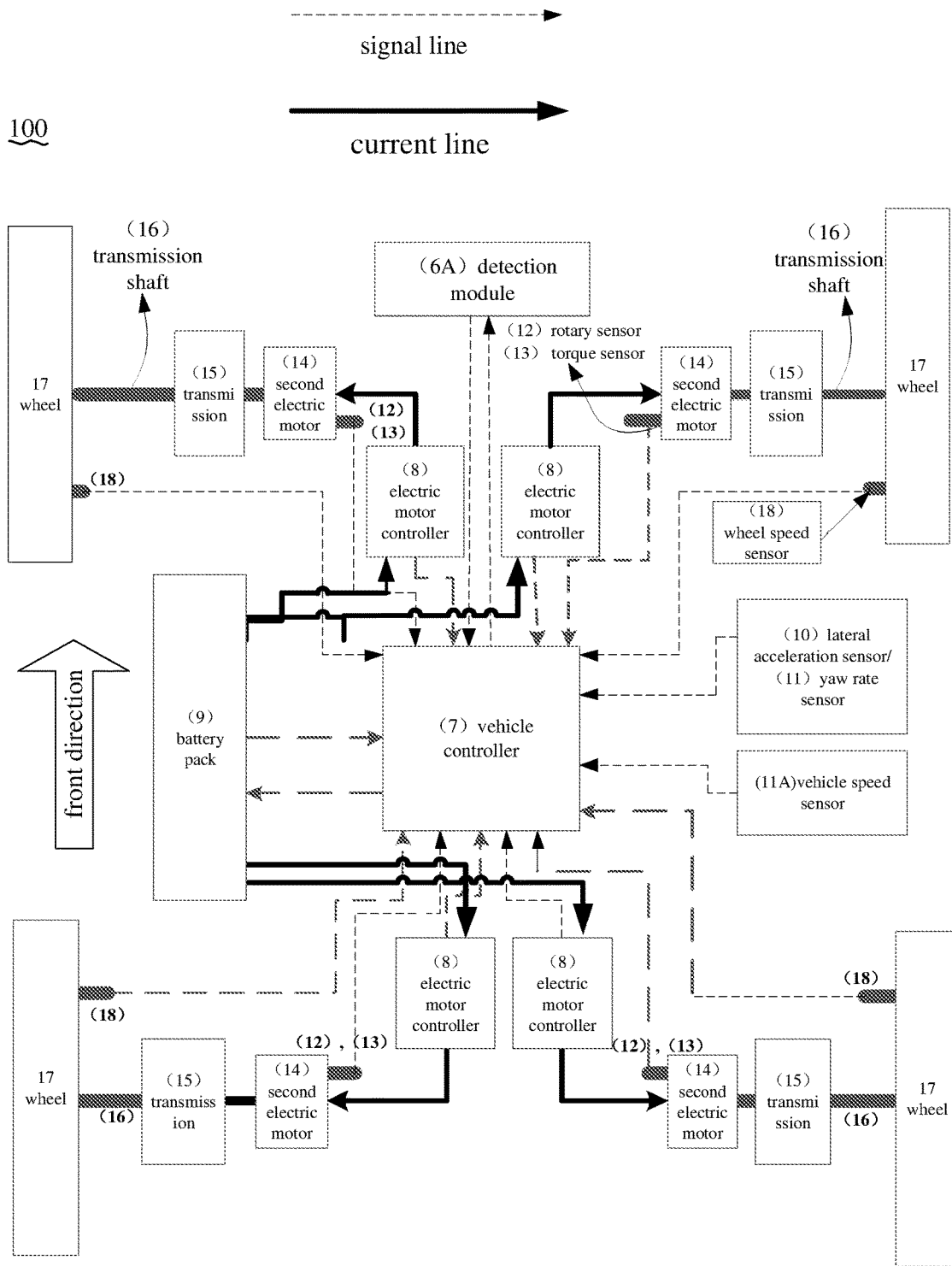
FIG. 1 is a schematic module diagram of an auxiliary steering system for preventing an electric vehicle from a steering malfunction according to an embodiment of the present invention.

The embodiments of the present invention will be detailed below in detail, and examples of the embodiments will be illustrated in the accompanying drawings throughout which identical or similar reference numerals represent identical or similar elements or functionally identical or similar elements. The embodiments described below with reference to the accompanying drawings are illustrative and merely intended to set forth but not construed to limit the present invention.

In the descriptions of the present invention, it should be understood that terms "first" and "second" are merely intended for a purpose of description, and shall not be understood as an indication or implication of relative importance or implicit indication of a quantity of indicated technical features. Therefore, features limited by "first" or "second" may explicitly or implicitly include one or more of the features. In the descriptions of the present invention, "multiple" indicates two or more, unless otherwise specified.

In the descriptions of the present invention, it should be noted that unless otherwise explicitly specified and defined, terms such as "install", "mutually connect", and "connection" should be understood broadly. For example, a connection may be a fixed connection, a detachable connection, or an integral connection; or may be a mechanical connection or an electrical connection or mutual communication; or may be a direct connection, an indirect connection implemented by using an intermediate medium, or an internal connection between two elements or an interaction relationship between two elements. A person of ordinary skill in the art may understand specific meanings of the foregoing terms in the present invention in specific cases.

The following disclosure provides many different embodiments or examples to implement different structures of the present invention. To simplify the disclosure of the present invention, the components and settings of specific examples are described below. Certainly, the examples are merely for illustration purposes, and are not intended to limit the present invention. In addition, the present invention may repeat reference numerals and/or letters in the different examples. This repetition is for the purpose of simplicity and clarity and does not in itself indicate a relationship between the various embodiments and/or settings discussed. In addition, the present invention provides examples of various particular processes and materials, but a person of ordinary skill in the art will recognize that other processes and/or materials may be applied and/or used.

With the development of new energy of vehicles, four-wheel independently driven electric vehicles emerge. Because a four-wheel independently driven electric vehicle uses four motors to control four wheels independently, and has a quick motor response speed (a response time is approximately 20 milliseconds), the four-wheel independently driven electric vehicle has a greater advantage relative to a mechanical steering response time of a conventional steering system. Therefore, how to prevent a steering control malfunction by using a four-wheel independently driven electric vehicle becomes an urgent problem to be resolved.

Referring to FIG. 1, an embodiment of the present invention provides an auxiliary steering system for an electric vehicle (which is referred to as an auxiliary steering system below). The auxiliary steering system 100 is applicable to a four-wheel independently driven electric vehicle. The electric vehicle includes four motor controllers 8 and four motors 14. Each motor controller 8 may independently control a corresponding motor 14, and the motor controller 8 may be connected to the motor 14 by using a high-voltage wire. Each motor 14 is used to control running of a corresponding wheel 17, for example, generate a driving force or a brake force for the wheel 17. In an embodiment, the motor 14 is a wheel side motor, and the wheel motor is connected to the corresponding wheel 17 by using a transmission 15 and a rotational shaft 16. In another embodiment, a motor 14 may be an in-wheel motor, and in this case, the transmission 15 may be removed from the electric vehicle, facilitating a component deployment of the electric vehicle.

In addition, the electric vehicle further includes a battery pack 9, wheel speed sensors 18, a resolver sensor 12 and a torque sensor 13 of the motor 14, a lateral acceleration sensor 10, a yaw rate sensor 11, and a vehicle speed sensor 11A.

The battery pack 9 is connected to the motor controller 8 by using a high-voltage wire, and communicates with a vehicle controller 7.

The wheel speed sensor 18 is used to detect a wheel speed signal of a corresponding wheel 17. The resolver sensor 12 of the motor 14 is used to detect a rotational speed signal of the corresponding motor 14, and the torque sensor 13 of the motor 14 is used to detect a torque signal of the corresponding motor 14. The yaw rate sensor 11 is used to detect a yaw rate signal of the vehicle, the lateral acceleration sensor 10 is used to detect a lateral acceleration signal of the vehicle, and the vehicle speed sensor 11A is used to detect a vehicle speed signal of the vehicle. It may be understood that, the lateral acceleration sensor 10 and the yaw rate sensor 11 may be integrated together. The vehicle controller 7 may collect the foregoing signals and control running of the electric vehicle.

That the motor 14 generates a driving force for the wheel 17 means that the motor 14 drives the wheel 17 to rotate, causing the vehicle to move forward or backward. That the motor 14 generates a brake force for the wheel 17 means that the motor 14 blocks rotation of the wheel 17, causing the vehicle to decelerate or stop.

The brake force generated by the motor 14 for the vehicle includes two forms: 1) regenerative braking; and 2) reverse drive.

The regenerative braking means that the motor 14 is a generator but not a drive motor. The wheel 17 drives the motor 14 to generate electric energy. A rotor of the motor 14 cuts magnetic induction lines of a stator to generate a reverse resistance, to block the rotation of the wheel 17, thereby achieving a deceleration effect. In addition, the motor 14 generates recyclable electric energy.

The reverse drive means that the motor controller 8 controls a current of the motor 14 to be in a reverse direction (in this case, a direction of the current is reverse to a direction of a current by using which the motor 14 generates a normal driving force for the wheel 17), so that the motor 14 generates a reverse torque to block the rotation of the wheel 17, causing a rotational speed of the wheel 17 to decrease or decrease to zero, or causing the wheel 17 to reversely rotate.

Therefore, in this embodiment, a brake torque of the motor for the wheel 17 includes two forms: a regenerative braking torque and a reverse drive torque.

The auxiliary steering system 100 includes a detecting circuit 6A and the vehicle controller 7. The detecting circuit 6A includes a detection controller 6 and an aligning motor 4.

The detection controller 6 is used to detect whether a steering assisting device 2 is normal. If not, the detection controller 6 is used to control a drive rack 5A of the aligning motor 4 to drive wheels 17 of the vehicle to align, and send a steering malfunction signal, a steering wheel torque signal, and a direction signal; or if yes, the detection controller 6 is used to continue to detect whether the steering assisting device 2 is normal.

The vehicle controller 7 is used to control, by using the motor controller 8 according to the steering malfunction signal, the steering wheel torque signal, and the direction signal, the motor 14 to increase a drive torque of an outer front wheel 17 of the vehicle, brake an inner rear wheel 17 of the vehicle, and stop driving an inner front wheel 17 and an outer rear wheel 17 of the vehicle.

Figure 2:
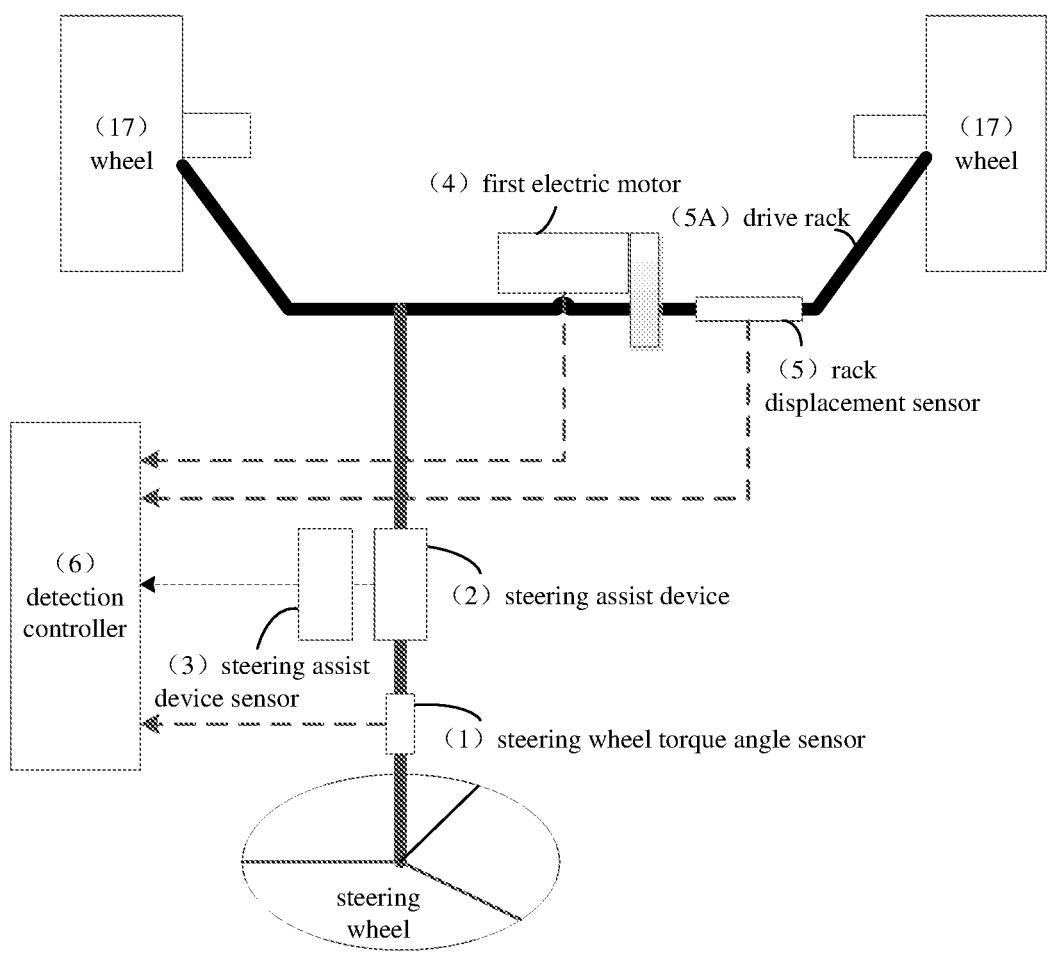
FIG. 2 is a schematic module diagram of a detecting circuit of an auxiliary steering system for preventing an electric vehicle from a steering malfunction according to an embodiment of the present invention.

In an embodiment, with reference to FIG. 2, the detecting circuit 6A includes a steering assisting device sensor 3.

The steering assisting device sensor 3 is used to detect an operating parameter of the steering assisting device 2. The steering assisting device 2 may be determined according to a different vehicle steering system. For example, when the vehicle steering system uses electronic assistance, the steering assisting device 2 is a steering motor, and when the vehicle steering system uses hydraulic assistance, the steering assisting device 2 is a hydraulic assistance device. Therefore, the steering assisting device sensor 3 includes a steering motor resolver sensor or a hydraulic sensor. The steering motor resolver sensor may detect a rotational speed of a steering motor, and the hydraulic sensor may detect fluid pressure of a hydraulic assistance device.

The detection controller 6 is, for example, an electronic control unit (ECU) for a steering malfunction, and is used to: collect the operating parameter of the steering assisting device 2, and determine, according to the operating parameter of the steering assisting device 2, whether the steering assisting device 2 is normal. For example, the detection controller 6 may collect a rotational speed of a steering motor or fluid pressure of a hydraulic assistance device, to determine whether the steering motor or the hydraulic assistance device is normal.

If the steering assisting device 2 is abnormal, the detection controller 6 is used to: control the drive rack 5A of the aligning motor 4 to drive the wheels 17 of the vehicle to align, and send the steering malfunction signal, the steering wheel torque signal, and the direction signal. The rack 5A is connected to a turning wheel 17 and a steering wheel. When steering is normal, the rack 5A may convert a turning amount of the steering wheel into a turning amount of the wheels 17. When a steering malfunction occurs, the rack 5A is driven by the aligning motor 4 to drive the wheels 17 of the vehicle to align.

When the steering assisting device 2 is abnormal, the detection controller 6 determines that a steering malfunction occurs, and the detection controller 6 sends an aligning signal to the aligning motor 4. The aligning motor 4 rotates according to the align signal, to drive the rack 5A to move left or right, thereby driving the wheels 17 of the vehicle to align.

In addition, to monitor whether the rack 5A executes a related control requirement, the detecting circuit 6A further includes a rack displacement sensor 5. The rack displacement sensor 5 is installed on the rack 5A and used to: monitor a movement amount of the rack 5A and send the movement amount of the rack 5A to the detection controller 6. In this way, the detection controller 6 can obtain the movement amount of the rack 5A to determine whether the rack 5A executes the related control requirement, and if the rack 5A does not execute the related control requirement, the detection controller 6 sends an alarm signal.

In addition, if the steering assisting device 2 is abnormal, the detection controller 6 sends the steering malfunction signal, the steering wheel torque signal, and the direction signal to the vehicle controller 7. The steering wheel torque signal and the direction signal may be collected by a steering wheel torque angle sensor 1, and sent by the detection controller 6 to the vehicle controller 7.

The steering wheel torque angle sensor 1, the steering assisting device sensor 3, and the rack displacement sensor 5 may communicate with each other by using a controller area network (CAN) bus, and send a monitored steering status signal to the detection controller 6.

With reference to FIG. 1, if the vehicle turns to the left of FIG. 1 (that is, turns left), outer side wheels are right wheels 17, inner wheels are left wheels 17, the outer front wheel is an upper right wheel 17, the inner front wheel is an upper left wheel 17, the inner rear wheel is a lower left wheel 17, and the outer rear wheel is a lower right wheel 17.

If the vehicle turns to the right of FIG. 1 (that is, turns right), outer side wheels are left wheels 17, inner wheels are right wheels 17, the outer front wheel is an upper left wheel 17, the inner front wheel is an upper right wheel 17, the inner rear wheel is a lower right wheel 17, and the outer rear wheel is a lower left wheel 17.

The steering malfunction signal may be used for triggering the vehicle controller 7 to perform auxiliary steering, for example, increase the drive torque of the outer front wheel 17 of the vehicle, brake the inner rear wheel 17 of the vehicle, stop driving the inner front wheel 17 and the outer rear wheel 17 of the vehicle, and so on. The vehicle controller 7 may obtain a steering wheel torque according to the steering wheel torque signal, and obtain an increased drive torque of the outer front wheel 17 of the vehicle and a brake torque of the inner rear wheel 17 of the vehicle according to the steering wheel torque. The vehicle controller 7 is used to determine, during the auxiliary steering, the outer front wheel 17, the inner rear wheel 17, the inner front wheel 17, and the outer rear wheel 17 according to the direction signal, so as to control a turning direction of the vehicle.

The simulation shows that controlling the outer front wheel 17 and the inner rear wheel 17 achieves better steering effect than controlling the four wheels 17. Therefore, except the outer front wheel 17 and the inner rear wheel 17, drive torques of the other two wheels 17 are both decreased to zero, and a rotation yaw torque $\Delta M$ is formed to change a driving direction of the vehicle, thereby achieving a steering effect the same as a steering effect before a steering malfunction.

For example, the vehicle controller 7 presets a correspondence table between an increased drive torque of the outer front wheel 17 of the vehicle, a brake torque of the inner rear wheel 17 of the vehicle, and a steering wheel torque, and the correspondence table may be calibrated by using a test. The vehicle controller 7 obtains, from the correspondence table, the corresponding increased drive torque of the outer front wheel 17 and the brake torque of the inner rear wheel 17 of the vehicle according to the collected steering wheel torque signal.

Further, because the vehicle controller 7 achieves a steering effect by means of the yaw torque that is generated by the motor 14 by driving and braking the wheels of the vehicle 17, a capability of the motor 14 further needs to be considered in this embodiment. If the drive torque or the brake torque of the motor 14 is excessively large, the vehicle is prone to an excessively large yaw motion, and unstable cases such as a side slip, a roll-over, or a tail slide is likely to occur when the vehicle is at a high speed. Therefore, in an embodiment of the present invention, the vehicle controller 7 may restrict a torque of the motor 14 for the wheel, so that the vehicle can achieve an expected turning effect and can drive stably.

In this embodiment, when the steering assisting device 2 is abnormal, the vehicle controller 7 is used to determine, according to the steering wheel torque signal, whether the steering wheel torque is greater than a first predetermined steering wheel torque.

If the steering wheel torque is not greater than the first predetermined steering wheel torque, the vehicle controller 7 is used to: obtain an increased drive torque that corresponds to the steering wheel torque and that is of the outer front wheel 17 of the vehicle and the brake torque of the inner rear wheel 17 of the vehicle, and control, by using the motor controller 8 according to the increased drive torque of the outer front wheel 17 of the vehicle and the brake torque of the inner rear wheel 17 of the vehicle, the motor 14 to drive the outer front wheel 17 and brake the inner rear wheel 17.

If the steering wheel torque is greater than the first predetermined steering wheel torque, the vehicle controller 7 is used to: obtain an increased drive torque that corresponds to the first predetermined steering wheel torque and that is of the outer front wheel 17 of the vehicle and the brake torque of the inner rear wheel 17 of the vehicle, and control, by using the motor controller 8 according to the increased drive torque of the outer front wheel 17 of the vehicle and the brake torque of the inner rear wheel 17 of the vehicle, the motor 14 to drive the outer front wheel 17 and brake the inner rear wheel 17.

The first predetermined steering wheel torque may be calibrated by using a test. For example, during test calibration, after the increased drive torque is applied to the outer wheel 17 and the brake torque is applied to the inner rear wheel 17, the vehicle controller 7 may collect a lateral acceleration $a_y$, a yaw rate $\Psi$, and a sideslip angle $\beta$ of the vehicle, and determine whether the lateral acceleration $a_y$ is greater than a predetermined lateral acceleration, whether the yaw rate $\Psi$ is greater than a predetermined yaw rate, and whether the sideslip angle $\beta$ is greater than a predetermined sideslip angle.

The vehicle controller 7 may collect the yaw rate signal from the yaw rate sensor 11, and collect the lateral acceleration signal from the lateral acceleration sensor 10, so as to obtain the lateral acceleration $a_y$ and the yaw rate $\Psi$, and indirectly estimate the sideslip angle $\beta$ by using another sensor. For example, the sideslip angle $\beta$ may be estimated by using the following formula $$\beta = \frac{l_r - m * l_f * v_x^2 / (k_r * L)}{L(1 + K v_x^2)} \delta_f,$$

where Vx is a vehicle speed and may be obtained by the vehicle speed sensor 11A by detecting the vehicle speed signal, $\delta_f$ is a front wheel steering angle, and $\delta_f$ is solved according to a steering wheel steering angle detected by the steering wheel torque angle sensor 1 and a specific proportion relationship between the steering wheel steering angle and the front wheel steering angle. K is a stability factor, and $$K = \frac{m}{L^2}\left(\frac{l_f}{k_r} - \frac{l_r}{k_f}\right).$$

L is a wheelbase of the vehicle, and $l_f$ and $l_r$ are vehicle type parameters, which are respectively distances from front and rear shafts of the vehicle to a centroid of the vehicle and are fixed values. m is quality of the vehicle. kf and kr are cornering stiffness of the front and rear shafts of the vehicle, and both are vehicle type parameters and are fixed values.

In an example, the lateral acceleration is set to 0.4 g, the yaw rate is set to 0.85 μm/v, and the sideslip angle is set to arctan(0.02 μm), where μ is a road adhesion coefficient, and for calculation, μ may be a fixed value and a specific value of μ may be designed according to parameters before delivery of the vehicle; v is a vehicle speed, and the vehicle controller 7 may collect the vehicle speed v from the vehicle speed sensor 11A; and g is a gravity acceleration.

When $a_y \leq 0.4$ g, $\Psi \leq 0.85$ μg/v, and $\beta \leq$ arctan(0.02 μg), the vehicle controller 7 determines that the vehicle can stably drive during the auxiliary steering, and control, by using the motor controller 8, the motor 14 to apply the increased drive torque to the outer front wheel 17 of the vehicle and apply the brake torque to the inner rear wheel 17. Therefore, when $a_y=0.4$ g, $\Psi=0.85$ μm/v, and $\beta=$arctan(0.02 μm), a corresponding steering wheel torque is calibrated as the first predetermined steering wheel torque.

When $a_y>0.4$ g, or $\Psi>0.85$ μm/v, or $\beta>$arctan(0.02 μm), the vehicle controller 7 determines that the vehicle is to be in an unstable working condition. In this case, the steering wheel torque is increased, and the vehicle controller 7 controls the wheel 17 by using the increased drive torque that corresponds to the first predetermined steering wheel torque and that is of the outer front wheel 17 and the brake torque of the inner rear wheel 17 instead of obtaining, according to an increased steering wheel torque, the corresponding increased drive torque of the outer front wheel 17 and the brake torque of the inner rear wheel 17 to control the wheel 17.

Therefore, in an embodiment of the present invention, a correspondence between the lateral acceleration $a_y$, the yaw rate $\Psi$, and the sideslip angle $\beta$, and the steering wheel torque, the increased drive torque of the outer front wheel 17, and the brake torque of the inner rear wheel 17 may be calibrated by using a test, and may be preset in the foregoing correspondence table.

Further, to keep steering feel or road feel of the vehicle consistent before and after the steering malfunction, a relationship between the steering wheel torque and the steering angle needs to be calibrated in the foregoing correspondence table. Even if the steering wheel cannot be turned, the vehicle controller 7 may simulate a value of the steering angle δ during normal steering according to values of steering moments applied to the outer front wheel 17 and the inner rear wheel 17. That is, in practice, turning radiuses of the vehicle are the same before and after the steering malfunction. Likewise, in an example, a relationship between the steering wheel torque, the steering angle, and the turning radius may be calibrated by using a test, and stored in the correspondence table.

After obtaining the turning radius, the vehicle controller 7 determines, according to the turning radius and the steering wheel torque, whether the brake torque that is applied by the motor 14 to the inner rear wheel 17 is in the form of regenerative braking or reverse drive.

If the steering wheel torque is not greater than the first predetermined steering wheel torque, the vehicle controller 7 is used to: obtain a turning radius of the vehicle according to the steering wheel torque signal, determine whether the turning radius of the vehicle is less than a predetermined turning radius, and determine whether the steering wheel torque is greater than a second predetermined steering wheel torque.

If the turning radius of the vehicle is not less than the predetermined turning radius and the steering wheel torque is not greater than the second predetermined steering wheel torque, the vehicle controller 7 is used to: control, by using the motor controller 8, the motor 14 to increase the drive torque of the outer front wheel 17 of the vehicle and regeneratively brake the inner rear wheel 17 of the vehicle.

If the turning radius of the vehicle is less than the predetermined turning radius and the steering wheel torque is greater than the second predetermined steering wheel torque, the vehicle controller 7 is used to: control, by using the motor controller 8, the motor 14 to increase the drive torque of the outer front wheel 17 of the vehicle and reversely drive the inner rear wheel 17 of the vehicle. The second predetermined steering wheel torque is less than the first predetermined steering wheel torque.

The "predetermined turning radius" herein may be understood as a critical point between a tight turn and a wide turn, that is, a critical point for distinguishing whether regenerative braking or reverse drive is applied to the inner rear wheel. The predetermined turning radius is calibrated by using a test and is stipulated artificially.

In an example, the vehicle controller 7 may obtain a brake torque of the regenerative braking and a brake torque of the reverse drive according to the steering wheel torque and the correspondence table.

In an embodiment of the present invention, to keep the vehicle speed of the vehicle consistent before and after the steering malfunction, a difference between the increased drive torque of the outer front wheel 17 and the brake torque of the inner rear wheel 17 may be greater than or equal to a sum of drive torques of the four wheels 17 before the steering malfunction. That is, $\Delta T_{F1} - \Delta T_{R1} \geq T_{F1} + T_{F2} + T_{R1} + T_{R2}$ (which is referred to as a formula 1 below), where $\Delta T_{F1}$ indicates the increased drive torque of the outer front wheel 17 of the vehicle, $\Delta T_{R1}$ indicates the brake torque of the inner rear wheel 17 of the vehicle, $T_{F1}$ indicates a drive torque of the outer front wheel 17 of the vehicle before the steering malfunction of the vehicle, $T_{F2}$ indicates a drive torque of the inner front wheel of the vehicle before the steering malfunction of the vehicle, $T_{R1}$ indicates a drive torque of the inner rear wheel of the vehicle before the steering malfunction of the vehicle, and $T_{R2}$ indicates a drive torque of the outer rear wheel of the vehicle before the steering malfunction of the vehicle.

It should be noted that, in this embodiment, a torque range of the single motor 14 is set to $0 \leq T \leq 450$ Nm, that is, $0 \leq \Delta T_{F1} \leq 450$ Nm; $0 \leq \Delta T_{R1} \leq 450$ Nm; $0 \leq T_{F1} \leq 450$ Nm; $0 \leq T_{F2} \leq 450$ Nm; $0 \leq T_{R1} \leq 450$ Nm; and $0 \leq T_{R2} \leq 450$ Nm.

The following describes value ranges of $\Delta T_{F1}$ and $\Delta T_{R1}$ by using $\Delta T_{F1} - \Delta T_{R1} = T_{F1} + T_{F2} + T_{R1} + T_{R2}$ as an example.

It can be learned from the formula 1 that $$\Delta T_{F1} - \Delta T_{R1} = T_{F1} + T_{F2} + T_{R1} + T_{R2} > 0 \qquad (2).$$

It is obtained from the formula (2) that $$\Delta T_{F1} = \Delta T_{R1} + T_{F1} + T_{F2} + T_{R1} + T_{R2} \geq T_{F1} + T_{F2} + T_{R1} + T_{R2} \qquad (3).$$

A value range of the increased drive torque $\Delta T_{F1}$ of the outer front wheel 17 is obtained from the formulas (2) and (3) and a range of peak value torques of the motor:

$$T_{F1} + T_{F2} + T_{R1} + T_{R2} \leq \Delta T_{F1} \leq 450 \text{ Nm} \qquad (4).$$

A value range of a regenerative braking torque or a reverse drive torque $\Delta T_{R1}$ of the inner rear wheel 17 may be obtained by substituting the formula (3) into the formula (4):

$$0 \leq \Delta T_{R1} \leq 450 \text{ Nm} - (T_{F1} + T_{F2} + T_{R1} + T_{R2}) \qquad (5).$$

Figure 3:
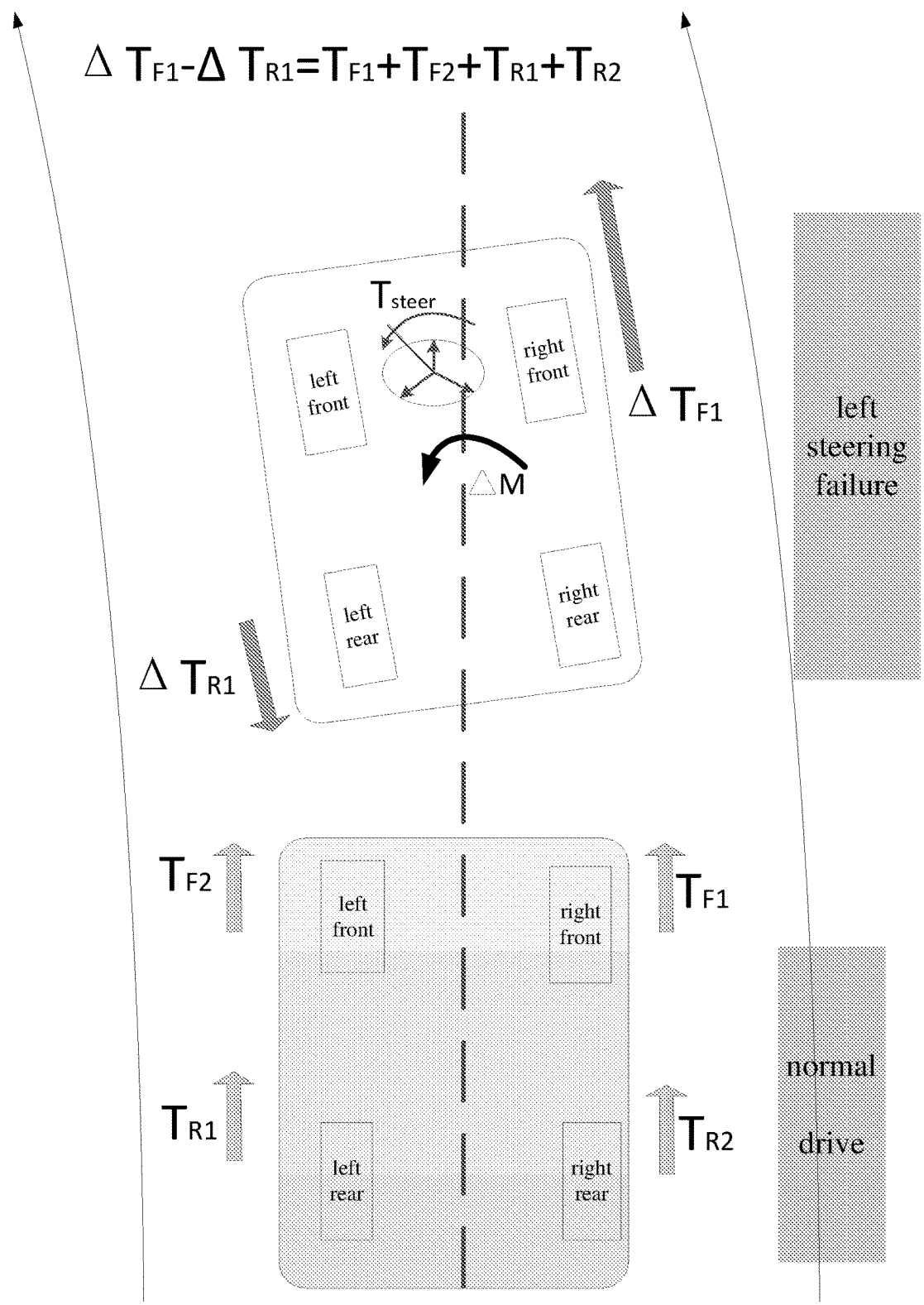
FIG. 3 is a schematic diagram of an application scenario of an auxiliary steering system for preventing an electric vehicle from a steering malfunction according to an embodiment of the present invention.

In the following, referring to FIG. 3, an embodiment of the auxiliary steering system 100 of the present invention is described by using an example in which a steering malfunction occurs when the vehicle turns left.

If the vehicle controller 7 determines, according to the direction signal, that the vehicle turns left, the vehicle controller 7 collects the steering wheel torque signal, the vehicle speed signal, the lateral acceleration signal, the yaw rate signal, and the sideslip angle signal to obtain the steering wheel torque $T_{steer}$, the vehicle speed v, the lateral acceleration $a_y$, the yaw rate $\Psi$, and the sideslip angle $\beta$. The vehicle controller 7 obtains, from the correspondence table, the increased drive torque $\Delta T_{F1}$ of the outer front wheel 17 (that is, an upper right wheel 17 in FIG. 3), the brake torque $\Delta T_{R1}$ of the inner rear wheel 17 (that is, a lower left wheel 17 in FIG. 3), and the turning radius R according to the steering wheel torque $T_{steer}$.

The vehicle controller 7 sends an execution signal to the four motor controllers 8, so that the increased drive torque of the outer front wheel 17 is $\Delta T_{F1}$, the inner rear wheel 17 is switched from the drive torque into a brake torque of regenerative braking or a reverse drive, a torque value of the brake torque is $\Delta T_{R1}$, and drive torques of the other two wheels 17 are decreased to zero.

Then, the vehicle controller 7 compares the turning radius R with the predetermined turning radius, compares the steering wheel torque $T_{steer}$ with the second predetermined steering wheel torque, and determines whether a brake torque of regenerative braking or a brake torque of reverse drive is used as the brake torque of the inner rear wheel 17.

During a tight turn, the turning radius $R \geq R_i$, and the steering wheel torque $T_{steer} \leq T_i$, and the vehicle controller 7 controls, by using the motor controller 8, the motor 14 to apply a brake torque in the form of regenerative braking to the inner rear wheel 17, to satisfy a turning requirement, where $R_i$ is the predetermined turning radius, $T_i$ is the second predetermined steering wheel torque, and values of $R_i$ and $T_i$ need to be calibrated by using a test according to a maximum regenerative torque value.

During a wide turn, the turning radius $R < R_i$, and the steering wheel torque $T_{steer} > T_i$, and regenerative braking for the inner rear wheel 17 is insufficient to provide a corresponding yaw torque. The vehicle controller 7 needs to control, by using the motor controller 8, the motor 14 to reversely drive the inner rear wheel 17, to provide a larger backward driving force and form a larger yaw torque, implementing vehicle steering.

In an example, when the vehicle speed is $V \leq 60$ km/h and the steering wheel steering angle is less than 45°, or the vehicle speed is $V > 60$ km/h and the steering wheel steering angle is less than 10°, it may be considered as a tight turn, and other ranges may be considered as a wide turn. A relationship between the steering wheel steering angle $\delta$ and the turning radius R is $R = L/\tan \delta$, where L is the wheelbase of the vehicle.

The following describes a test process of calibrating the steering wheel torque and another parameter in this embodiment of the present invention, that is, a process of making the correspondence table.

In this test calibration process, an example in which the vehicle turns left before or after the steering malfunction is used for description. The correspondence table includes Table 1 and Table 2.

A test calibration method is as follows. A test 1 may be used to make Table 1. First, a vehicle that normally turns left is used to detect, when steering wheel steering angles $\delta_i$ are different, steering wheel torques $T_{steer}$, torques $T_{F1}$, $T_{F2}$, $T_{R1}$+, $T_{R2}$ of the four wheels, and turning radiuses R corresponding to the steering wheel steering angles. Left turning data of the vehicle is recorded in the following table 1.

TABLE 1

| Experimental data of a vehicle during normal left turning | | | | |
|---|---|---|---|---|
| NO. | $\delta_i$ | $T_{steer}$ | $T_{F1}$, $T_{F2}$, $T_{R1}$, $T_{R2}$ | R |
| 1 | 10° | $T_1$ | $T_{F11}$, $T_{F21}$, $T_{R11}$, $T_{R21}$ | $R_1$ |
| 2 | 20° | $T_2$ | $T_{F12}$, $T_{F22}$, $T_{R12}$, $T_{R22}$ | $R_2$ |
| ... | ... | ... | ... | ... |
| n | 540° | $T_n$ | $T_{F1n}$, $T_{F2n}$, $T_{R1n}$, $T_{R2n}$ | $R_n$ |

A test 2 may be used to make Table 2. A vehicle that encounters a left turning steering malfunction is calibrated, and the vehicle and the vehicle that is normally tested are required to be in a same batch and of a same model. Test data is recorded as the following table 2.

TABLE 2

| Experimental data of a vehicle during a steering malfunction | | | | | | | |
|---|---|---|---|---|---|---|---|
| No. | $T_{steer}$ | $\Delta T_{F1}$, $\Delta T_{R1}$ | $\Delta T$ | R | $a_y$ | $\psi$ | B |
| 1 | $T_1'$ | $\Delta T_{F11}$, $\Delta T_{R11}$ | $\Delta T_{F11} - \Delta T_{R11}$ | $R_1'$ | $a_{y1}$ | $\psi_1$ | $\beta_1$ |
| 2 | $T_2'$ | $\Delta T_{F12}$, $\Delta T_{R12}$ | $\Delta T_{F12} - \Delta T_{R12}$ | $R_2'$ | $a_{y2}$ | $\psi_2$ | $\beta_2$ |
| ... | ... | ... | | | | | ... |
| n | $T_n'$ | $\Delta T_{F1n}$, $\Delta T_{R1n}$ | $\Delta T_{F1n} - \Delta T_{R1n}$ | $R_n'$ | $a_{yn} \leq 0.4$ g | $\psi_n \leq 0.85 \frac{\mu g}{v}$ | $\beta_n \leq \arctan(0.02\ \mu g)$ |

Specifically, a value of a steering wheel torque $T_i$ ($1 \leq i \leq n$) in the test 1 is required to be equal to a value of a steering wheel torque $T_i'$ in the test 2, that is $T_i = T_i'$. Values of $\Delta T_{F1i}$ and $\Delta T_{R1i}$ are adjusted ($\Delta T_{F1i} > \Delta T_{R1i}$, and directions are reverse), so that turning radiuses are $R_i = R_i'$. In addition, to keep a same vehicle speed before and after the steering malfunction, it is required that $\Delta T_{F1i} - \Delta T_{R1i} \geq T_{F1i} + T_{F2i} + T_{R1i} + T_{R2i}$.

In the test 2, when a lateral acceleration of the vehicle reaches $a_{yi} = 0.4$ g, or a yaw rate reaches $\Psi_i = 0.85$ μm/v, or a sideslip angle reaches $\beta_i = \arctan(0.02\ \mu m)$, the steering wheel torque is no longer increased in the test. In this case, the corresponding steering wheel torque is the first predetermined steering wheel torque, a torque value of a motor is a value limit during the steering malfunction, and a corresponding turning radius is a minimum turning radius during the steering malfunction.

Figure 4:
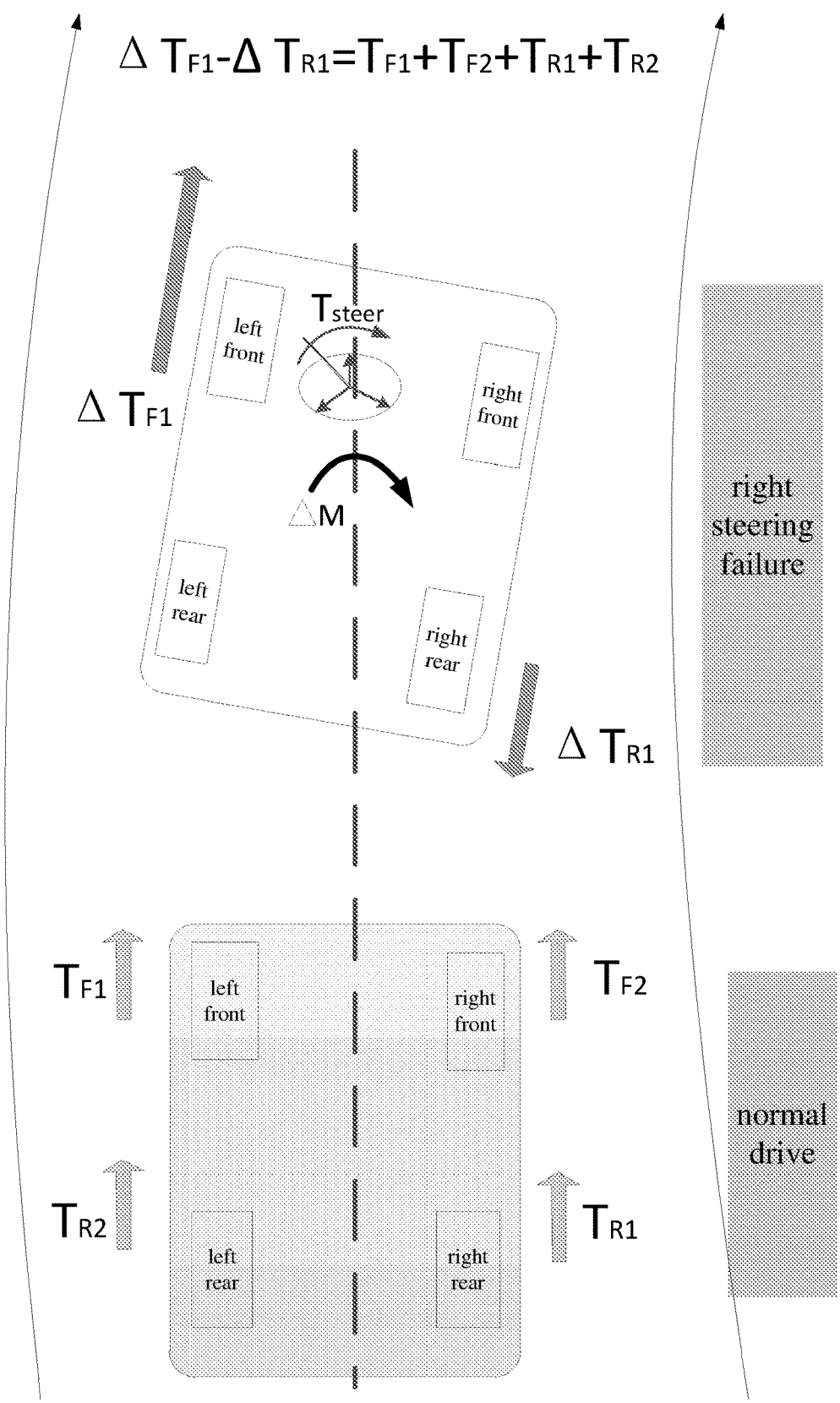
FIG. 4 is a schematic diagram of another application scenario of an auxiliary steering system for preventing an electric vehicle from a steering malfunction according to an embodiment of the present invention.

Likewise, FIG. 4 shows a schematic diagram of an application scenario of the auxiliary steering system when the vehicle turns right. If the vehicle controller 7 determines, according to the direction signal, that the vehicle turns right, a control principle and a test calibration method are the same as those when the vehicle turns left. Torques of the outer front wheel and the inner rear wheel are controlled, to cause the vehicle to turn right. Details are not described herein.

In summary, in the foregoing auxiliary steering system 100, when the detection controller 6 detects that the steering assisting device 2 is abnormal, the vehicle controller 7 is capable of controlling, by using the motor controller 8, the motor 14 to perform corresponding actions on the wheels 17 of the vehicle, to keep normal steering of the vehicle, thereby ensuring safety of the vehicle. At the same time, the foregoing auxiliary steering system 100 performs steering control on the wheels of the vehicle 17 by using the motor 14. Therefore, a steering control response time is shorter.

Figure 5:
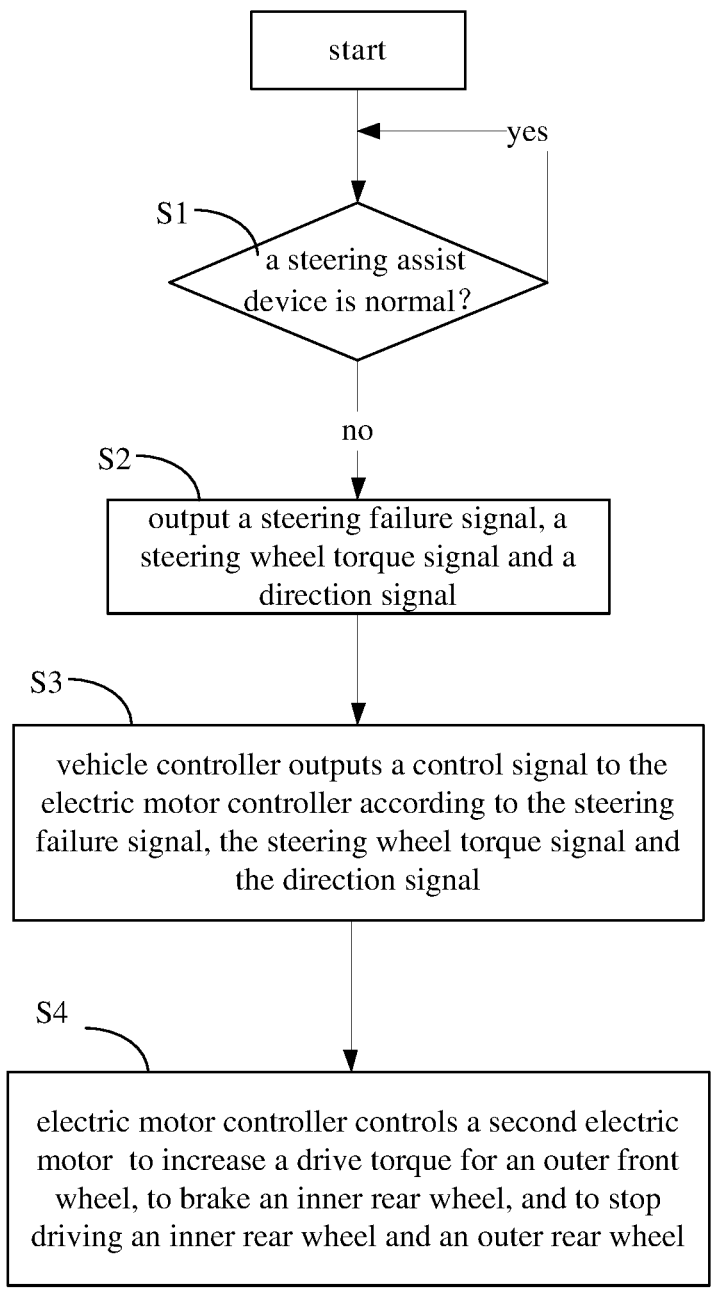
FIG. 5 is a schematic flowchart of an auxiliary steering method for preventing an electric vehicle from a steering malfunction according to an embodiment of the present invention.

With reference to FIG. 5, an embodiment of the present invention provides an auxiliary steering method for preventing an electric vehicle from a steering malfunction (which is referred to as an auxiliary steering method below). The auxiliary steering method may be implemented by the auxiliary steering system in the foregoing embodiment. The auxiliary steering method includes the following steps.

S1: A detection controller of a detecting circuit detects whether a steering assisting device is normal.

S2: If the detection controller of the detecting circuit detects that steering assisting device is normal, continue to perform S1.

S3: If the detection controller of the detecting circuit detects that the steering assisting device is abnormal, the detection controller controls a drive rack of an aligning motor of the detecting circuit to drive wheels of the vehicle to align, and the detection controller sends a steering malfunction signal, a steering wheel torque signal, and a direction signal.

S4: A vehicle controller controls, by using a motor controller according to the steering malfunction signal, the steering wheel torque signal, and the direction signal, the motor to increase a drive torque of an outer front wheel of the vehicle, brake an inner rear wheel of the vehicle, and stop driving an inner front wheel and an outer rear wheel of the vehicle.

In step S1, the detecting circuit 6A further includes a steering assisting device sensor 3.

The steering assisting device sensor 3 is detects an operating parameter of the steering assisting device 2. The steering assisting device 2 may be determined according to a different vehicle steering system. For example, when the vehicle steering system uses electronic assistance, the steering assisting device 2 is a steering motor, and when the vehicle steering system uses hydraulic assistance, the steering assisting device 2 is a hydraulic assistance device. Therefore, the steering assisting device sensor 3 includes a steering motor resolver sensor or a hydraulic sensor. The steering motor resolver sensor may detect a rotational speed of a steering motor, and the hydraulic sensor may detect fluid pressure of a hydraulic assistance device.

The detection controller 6 collects the operating parameter of the steering assisting device 2, and determines, according to the operating parameter of the steering assisting device 2, whether the steering assisting device is normal. If the steering assisting device is abnormal, step S3 is performed; or if the steering assisting device is normal, continue to perform step S2.

For example, the detection controller 6 may collect a rotational speed of a steering motor or fluid pressure of a hydraulic assistance device, to determine whether the steering motor or the hydraulic assistance device is normal.

In step S3, that is, if the steering assisting device 2 is abnormal, the detection controller 6 controls the drive rack 5A of the aligning motor 4 to drive the wheels 17 of the vehicle to align, and sends the steering malfunction signal, the steering wheel torque signal, and the direction signal.

In addition, to monitor whether the rack 5A executes a related control requirement, the detecting circuit 6A further includes a rack displacement sensor 5. The rack displacement sensor 5 monitors a movement amount of the rack 5A and sends the movement amount of the rack 5A to the detection controller 6. In this way, the detection controller 6 can obtain the movement amount of the rack 5A to determine whether the rack 5A executes the related control requirement, and if the rack 5A does not execute the related control requirement, the detection controller 6 sends an alarm signal.

The detecting circuit 6A further includes a steering wheel torque angle sensor 1, and the steering wheel torque angle sensor 1 detects the steering wheel torque signal and the direction signal.

The steering wheel torque angle sensor 1, the steering assisting device sensor 3, and the rack displacement sensor 5 may communicate with each other by using a CAN bus, and send a monitored steering status signal to the detection controller 6.

In step S4, the steering malfunction signal may be used for triggering the vehicle controller 7 to perform auxiliary steering, for example, increase the drive torque of the outer front wheel 17 of the vehicle, brake the inner rear wheel 17 of the vehicle, stop driving the inner front wheel 17 and the outer rear wheel 17 of the vehicle, and so on. The vehicle controller 7 may obtain a steering wheel torque signal according to the steering wheel torque signal, and obtain an increased drive torque of the outer front wheel 17 of the vehicle and a brake torque of the inner rear wheel 17 of the vehicle according to the steering wheel torque. The vehicle controller 7 is used to determine, during the auxiliary steering, the outer front wheel 17, the inner rear wheel 17, the inner front wheel 17, and the outer rear wheel 17 according to the direction signal, so as to control a turning direction of the vehicle.

For example, the vehicle controller 7 presets a correspondence table between an increased drive torque of the outer front wheel 17 of the vehicle, a brake torque of the inner rear wheel 17 of the vehicle, and a steering wheel torque, and the correspondence table may be calibrated by using a test. The vehicle controller 7 obtains, from the correspondence table, the corresponding increased drive torque of the outer front wheel 17 and the brake torque of the inner rear wheel 17 of the vehicle according to the collected steering wheel torque.

Further, the vehicle controller 7 may restrict a torque of the motor 14 for the wheel, so that the vehicle can achieve an expected turning effect and can drive stably.

Figure 6:
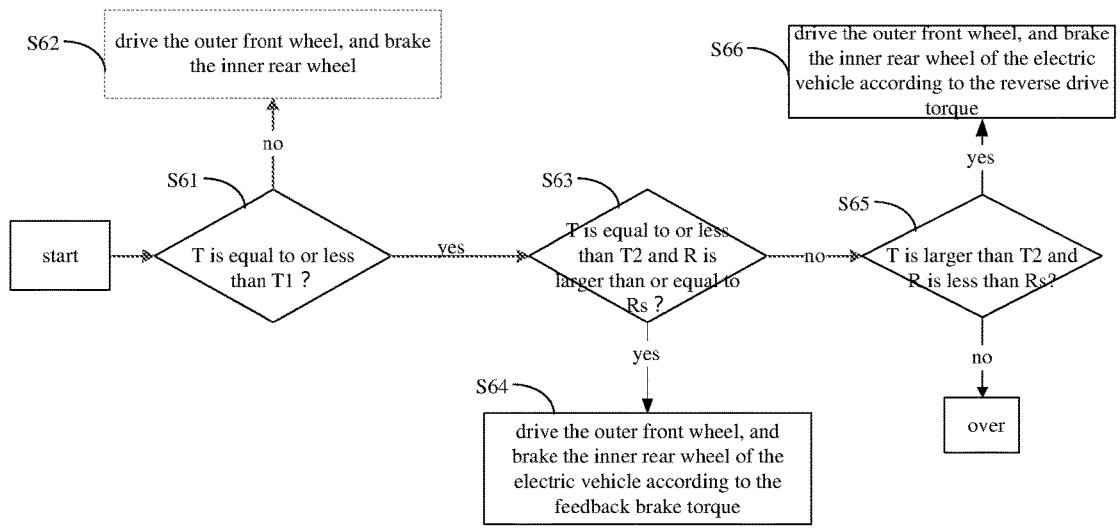
FIG. 6 is another schematic flowchart of an auxiliary steering method for preventing an electric vehicle from a steering malfunction according to an embodiment of the present invention.

In this embodiment, referring to FIG. 6, the vehicle controller 7 determines, according to the steering wheel torque signal, whether the steering wheel torque is greater than a first predetermined steering wheel torque.

If the steering wheel torque is not greater than the first predetermined steering wheel torque, the vehicle controller 7 obtains an increased drive torque that corresponds to the steering wheel torque and that is of the outer front wheel 17 of the vehicle and the brake torque of the inner rear wheel 17 of the vehicle, and controls, by using the motor controller 8 according to the increased drive torque of the outer front wheel 17 of the vehicle and the brake torque of the inner rear wheel 17 of the vehicle, the motor 14 to drive the outer front wheel 17 and brake the inner rear wheel 17.

If the steering wheel torque is greater than the first predetermined steering wheel torque, the vehicle controller 7 obtains an increased drive torque that corresponds to the first predetermined steering wheel torque and that is of the outer front wheel 17 of the vehicle and the brake torque of the inner rear wheel 17 of the vehicle, and controls, by using the motor controller 8 according to the increased drive torque of the outer front wheel 17 of the vehicle and the brake torque of the inner rear wheel 17 of the vehicle, the motor 14 to drive the outer front wheel 17 and brake the inner rear wheel 17.

The first predetermined steering wheel torque may be calibrated by using a test. For example, during test calibration, after the increased drive torque is applied to the outer wheel 17 and the brake torque is applied to the inner rear wheel 17, the vehicle controller 7 may collect a lateral acceleration $a_y$, a yaw rate $\Psi$, and a sideslip angle $\beta$ of the vehicle, and determine whether the lateral acceleration $a_y$ is greater than a predetermined lateral acceleration, whether the yaw rate $\Psi$ is greater than a predetermined yaw rate, and whether the sideslip angle $\beta$ is greater than a predetermined sideslip angle.

The vehicle controller 7 may collect the yaw rate signal from the yaw rate sensor 11, and collect the lateral acceleration signal from the lateral acceleration sensor 10, so as to obtain the lateral acceleration $a_y$ and the yaw rate $\Psi$, and indirectly estimate the sideslip angle $\beta$ by using another sensor. For example, the sideslip angle $\beta$ may be estimated by using the following formula $$\beta = \frac{l_r - m*l_f*v_x^2/(k_r*L)}{L(1+Kv_x^2)}\delta_f,$$

where Vx is a vehicle speed and may be obtained by the vehicle speed sensor 11A by detecting the vehicle speed signal, $\delta_f$ is a front wheel steering angle, and $\delta_f$ is solved according to a steering wheel steering angle detected by the steering wheel torque angle sensor 1 and a specific proportion relationship between the steering wheel steering angle and the front wheel steering angle. K is a stability factor, and $$K = \frac{m}{L^2}\left(\frac{l_f}{k_r} - \frac{l_r}{k_f}\right).$$

L is a wheelbase of the vehicle, and $l_f$ and $l_r$ are vehicle type parameters, which are respectively distances from front and rear shafts of the vehicle to a centroid of the vehicle and are fixed values. m is quality of the vehicle. kf and kr are cornering stiffness of the front and rear shafts of the vehicle, and both are vehicle type parameters and are fixed values.

In an example, the lateral acceleration is set to 0.4 g, the yaw rate is set to 0.85 μg/v, and the sideslip angle is set to arctan(0.02 μm), where μ is a road adhesion coefficient, and for calculation, μ may be a fixed value and a specific value of μ may be designed according to parameters before delivery of the vehicle; v is a vehicle speed, and the vehicle controller 7 may collect the vehicle speed v from the vehicle speed sensor 11A; and g is a gravity acceleration.

When $a_y \leq 0.4$ g, $\Psi \leq 0.85$ μg/v, and $\beta \leq$ arctan(0.02 μg), the vehicle controller 7 determines that the vehicle can stably drive during the auxiliary steering, and control, by using the motor controller 8, the motor 14 to apply the increased drive torque to the outer front wheel 17 of the vehicle and apply the brake torque to the inner rear wheel 17. Therefore, when $a_y=0.4$ g, $\Psi=0.85$ μm/v, and $\beta=$ arctan(0.02 μm), a corresponding steering wheel torque is calibrated as the first predetermined steering wheel torque.

When $a_y \leq 0.4$ g, or $\Psi > 0.85$ μg/v, or $\beta >$ arctan(0.02 μg), the vehicle controller 7 determines that the vehicle is to be in an unstable working condition. In this case, the steering wheel torque is increased, and the vehicle controller 7 controls the wheel 17 by using the increased drive torque that corresponds to the first predetermined steering wheel torque and that is of the outer front wheel 17 and the brake torque of the inner rear wheel 17 instead of obtaining, according to an increased steering wheel torque, the corresponding increased drive torque of the outer front wheel 17 and the brake torque of the inner rear wheel 17 to control the wheel 17.

Therefore, a correspondence between the lateral acceleration $a_y$, the yaw rate $\Psi$, and the sideslip angle $\beta$, and the steering wheel torque, the increased drive torque of the outer front wheel 17, and the brake torque of the inner rear wheel 17 may be calibrated by using a test, and may be preset in the foregoing correspondence table.

Further, to keep steering feel or road feel of the vehicle consistent before and after the steering malfunction, a relationship between the steering wheel torque and the steering angle needs to be calibrated in foregoing correspondence table. Even if the steering wheel cannot be turned, the vehicle controller 7 may simulate a value of the steering angle δ during normal steering according to values of steering moments applied to the outer front wheel 17 and the inner rear wheel 17. That is, in practice, turning radiuses of the vehicle are the same before and after the steering malfunction. Likewise, in an example, a relationship between the steering wheel torque, the steering angle, and the turning radius may be calibrated by using a test, and stored in the correspondence table.

If the steering wheel torque is not greater than the first predetermined steering wheel torque, after obtaining the turning radius, the vehicle controller 7 determines, according to the turning radius and the steering wheel torque, whether the brake torque that is applied by the motor 14 to the inner rear wheel 17 is in the form of regenerative braking or reverse drive.

Referring to FIG. 6, the vehicle controller 7 determines, according to the steering wheel torque signal, whether the turning radius of the vehicle is less than a predetermined turning radius, and determines whether the steering wheel torque is greater than a second predetermined steering wheel torque.

If the turning radius of the vehicle is not less than the predetermined turning radius and the steering wheel torque is not greater than the second predetermined steering wheel torque, the vehicle controller 7 controls, by using the motor controller 8, the motor 14 to increase the drive torque of the outer front wheel 17 of the vehicle and regeneratively brake the inner rear wheel 17 of the vehicle.

If the turning radius of the vehicle is less than the predetermined turning radius and the steering wheel torque is greater than the second predetermined steering wheel torque, the vehicle controller 7 controls, by using the motor controller 8, the motor 14 to increase the drive torque of the outer front wheel 17 of the vehicle and reversely drive the inner rear wheel 17 of the vehicle. The second predetermined steering wheel torque is less than the first predetermined steering wheel torque.

In an example, the vehicle controller 7 may obtain a brake torque of the regenerative braking and a brake torque of the reverse drive according to the steering wheel torque and the correspondence table.

In an embodiment of the present invention, to keep the vehicle speed of the vehicle consistent before and after the steering malfunction, a difference between the increased drive torque of the outer front wheel 17 and the brake torque of the inner rear wheel 17 may be greater than or equal to a sum of drive torques of the four wheels 17 before the steering malfunction. That is, $\Delta T_{F1} - \Delta T_{R1} \geq T_{F1} + T_{F2} + T_{R1} T_{R2}$, where $\Delta T_{F1}$ indicates the increased drive torque of the outer front wheel 17 of the vehicle, $\Delta T_{R1}$ indicates the brake torque of the inner rear wheel 17 of the vehicle, $T_{F1}$ indicates a drive torque of the outer front wheel 17 of the vehicle before the steering malfunction of the vehicle, $T_{F2}$ indicates a drive torque of the inner front wheel of the vehicle before the steering malfunction of the vehicle, $T_{R1}$ indicates a drive torque of the inner rear wheel of the vehicle before the steering malfunction of the vehicle, and $T_{R2}$ indicates a drive torque of the outer rear wheel of the vehicle before the steering malfunction of the vehicle.

For other parts not described in detail in the auxiliary steering method in this embodiment, refer to same or corresponding parts of the auxiliary steering system in the foregoing embodiments. Details are not described herein again.

In summary, in the foregoing auxiliary steering method, when the detection controller 6 detects that the steering assisting device 2 is abnormal, the vehicle controller 7 is capable of controlling, by using the motor controller 8, the motor 14 to perform corresponding actions on the wheels 17 of the vehicle, to keep normal steering of the vehicle, thereby ensuring safety of the vehicle. At the same time, in the foregoing auxiliary steering method, steering control is performed on the wheels of the vehicle 17 by using the motor 14. Therefore, a steering control response time is shorter.

An embodiment of the present invention further provides an electric vehicle including the auxiliary steering system for an electric vehicle according to any one of the foregoing embodiments.

In the descriptions of this specification, descriptions of reference terms "one embodiment", "some embodiments", "an exemplary embodiment", "an example", "a specific example", or "some examples" are intended to indicate that specific features, structures, materials, or characteristics described with reference to the embodiment or example are included in at least one embodiment or example of the present invention. In this specification, schematic descriptions of the foregoing terms do not refer to a same embodiment or example. In addition, the specific features, the structures, the materials or the characteristics that are described may be combined in a proper manner in any one or more embodiments or examples.

In addition, terms "first" and "second" are merely intended for a purpose of description, and shall not be understood as an indication or implication of relative importance or an implicit indication of a quantity of indicated technical features. Therefore, a feature modified by "first" or "second" may explicitly or implicitly include at least one such a feature. In the descriptions of the present invention, unless otherwise explicitly specified, the meaning of "plurality" is at least two, for example, two or three.

Descriptions of any process or method described in the flowcharts or herein in other manners may be understood as modules, sections, or parts of code that includes one or more executable instructions that are used to implement steps of specific logical functions or processes, and that the scope of an embodiment of the present invention includes other embodiments. Instead of a shown or discussed sequence, the related functions may be executed basically at the same time or in an order reverse to the shown or discussed sequence. This should be understood by a person skilled in the art to which the embodiments of the present invention belong.

Logic and/or steps described in the flowcharts or herein may be, for example, considered as a sequencing table used for implementing executable instructions of logical functions, and may be specifically implemented in any computer readable medium, to be used by an instruction execution system, apparatus, or device (for example, a system based on a computer, a system including a processor, or another system that can obtain instructions from an instruction execution system, apparatus, or device and execute the instructions), or used by combining the instruction execution system, apparatus, or device. In this specification, the "computer readable medium" may be any apparatuses that can contain, store, communicate, propagate, or transmit a program for execution by an instruction execution system, apparatus, or device or in combination with an instruction execution system, apparatus, or device. More specific examples of the computer readable medium (non-exhaustive lists) include the following: an electrical connection portion having one or more cablings (electronic apparatus), a portable computer enclosure (magnetic apparatus), a random access memory (RAM), a read-only memory (ROM), an erasable programmable read-only memory (EPROM or flash memory), an optical fiber apparatus, and a portable compact disc read-only memory (CD-ROM). In addition, the computer readable medium even may be a paper that can be printed with the program or other proper media, because the paper or the other media, for example, may be optically scanned, next the program is obtained in an electronic manner by processing with editing, interpretation, or other proper manners if necessary, then the program is stored in a computer memory.

It should be understood that parts of the present invention can be implemented by using hardware, software, firmware, or combinations thereof. In the foregoing embodiments, a plurality of steps or methods can be implemented by using software or firmware that are stored in a memory and are executed by a proper instruction execution system. For example, if the plurality of steps or methods is implemented by software, which is the same as that in another embodiment, any one or a combination of the following technologies that are known in the art may be used for embodiment: a discrete logic circuit having a logic gate circuit used to implement a logic function on a data signal, an application-specific integrated circuit having a proper combined logic gate circuit, a programmable gate array (PGA), a field programmable gate array (FPGA), or the like.

It may be understood by a person of ordinary skill in the art that all or some of the steps of the method of the foregoing embodiments may be implemented by using a program instructing relevant hardware. The program may be stored in a computer readable storage medium. When the program is executed, one or a combination of steps of the method embodiments is included.

In addition, functional units in the embodiments of the present invention may be integrated into one processing module, or each of the units may exist alone physically, or two or more units are integrated into one module. The integrated modules may be implemented in the form of hardware or software functional modules. If implemented in the form of software functional modules and sold or used as an independent product, the integrated modules may also be stored in a computer readable storage medium.

The aforementioned storage medium may be a read-only memory, a magnetic disk or an optical disc. Although the embodiments of the present invention are shown and described above, it may be understood that the foregoing embodiments are examples, and cannot be understood as limitations to the present invention. A person of ordinary skill in the art may make changes, modifications, replacements, and variations to the foregoing embodiments within the scope of the present invention.

What is claimed is:

1. An auxiliary steering system for an electric vehicle, wherein the electric vehicle comprises a motor controller and a motor, and the auxiliary steering system comprises:
    a detecting circuit, comprising a detection controller and an aligning motor, wherein the detection controller is configured to:
        continuously detect whether a steering assisting device is normal, until the steering assisting device is abnormal; and
        when the steering assisting device is abnormal, control a drive rack of the aligning motor to drive wheels of the vehicle to align, and send a steering malfunction signal, a steering wheel torque signal, and a direction signal; and
    a vehicle controller, configured to:
        control, by using the motor controller according to the steering malfunction signal, the steering wheel torque signal, and the direction signal, the motor to increase a drive torque of an outer front wheel of the vehicle,
        brake an inner rear wheel of the vehicle, and
        stop driving an inner front wheel and an outer rear wheel of the vehicle.

2. The auxiliary steering system for an electric vehicle according to claim 1, wherein the vehicle controller is further configured to determine, according to the steering wheel torque signal, whether a steering wheel torque is greater than a first predetermined steering wheel torque; and
    the vehicle controller is further configured to:
        when the steering wheel torque is equal to or less than the first predetermined steering wheel torque, obtain an increased drive torque of the outer front wheel of the vehicle and a brake torque of the inner rear wheel of the vehicle, and control, by using the motor controller according to the increased drive torque of the outer front wheel of the vehicle and the brake torque of the inner rear wheel of the vehicle, the motor to drive the outer front wheel and brake the inner rear wheel, wherein the increased drive torque corresponds to the steering wheel; or when the steering wheel torque is greater than the first predetermined steering wheel torque, obtain an increased drive torque of the outer front wheel of the vehicle and a brake torque of the inner rear wheel of the vehicle, and control, by using the motor controller according to the increased drive torque of the outer front wheel of the vehicle and the brake torque of the inner rear wheel of the vehicle, the motor to drive the outer front wheel and brake the inner rear wheel, wherein the increased drive torque corresponds to the first predetermined steering wheel torque.

3. The auxiliary steering system for an electric vehicle according to claim 2, wherein the detecting circuit comprises:
a steering assisting device sensor, configured to detect an operating parameter of the steering assisting device; and
the detection controller is configured to: collect the operating parameter of the steering assisting device, and determine, according to the operating parameter of the steering assisting device, whether the steering assisting device is normal.

4. The auxiliary steering system for an electric vehicle according to claim 2, wherein the vehicle controller is further configured to: when the steering wheel torque is equal to or less than the first predetermined steering wheel torque, obtain a turning radius of the vehicle according to the steering wheel torque signal, determine whether the turning radius of the vehicle is less than a predetermined turning radius, and determine whether the steering wheel torque is greater than a second predetermined steering wheel torque; and
the vehicle controller is further configured to:
when the turning radius of the vehicle is greater than or equal to the predetermined turning radius and the steering wheel torque is equal to or less than the second predetermined steering wheel torque, control, by using the motor controller, the motor to increase the drive torque of the outer front wheel of the vehicle and regeneratively brake the inner rear wheel of the vehicle; or
when the turning radius of the vehicle is less than the predetermined turning radius and the steering wheel torque is greater than the second predetermined steering wheel torque, control, by using the motor controller, the motor to increase the drive torque of the outer front wheel of the vehicle and reversely drive the inner rear wheel of the vehicle;
wherein the second predetermined steering wheel torque is less than the first predetermined steering wheel torque.

5. The auxiliary steering system for an electric vehicle according to claim 4, wherein the increased drive torque of the outer front wheel of the vehicle and the brake torque of the inner rear wheel of the vehicle satisfy the following relational formula:

$$\Delta T_{F1} - \Delta T_{R1} \geq T_{F1} + T_{F2} + T_{R1} + T_{R2};$$

wherein $\Delta T_{F1}$ indicates is the increased drive torque of the outer front wheel of the vehicle, $\Delta T_{R1}$ is the brake torque of the inner rear wheel of the vehicle, $T_{F1}$ is a drive torque of the outer front wheel of the vehicle before a steering malfunction of the vehicle, $T_{F2}$ indicates is a drive torque of the inner front wheel of the vehicle before the steering malfunction of the vehicle, $T_{R1}$ is a drive torque of the inner rear wheel of the vehicle before the steering malfunction of the vehicle, and $T_{R2}$ is a drive torque of the outer rear wheel of the vehicle before the steering malfunction of the vehicle.

6. The auxiliary steering system for an electric vehicle according to claim 4, wherein the detecting circuit comprises:
a steering assisting device sensor, configured to detect an operating parameter of the steering assisting device; and
the detection controller is configured to: collect the operating parameter of the steering assisting device, and determine, according to the operating parameter of the steering assisting device, whether the steering assisting device is normal.

7. The auxiliary steering system for an electric vehicle according to claim 5, wherein the detecting circuit comprises:
a steering assisting device sensor, configured to detect an operating parameter of the steering assisting device; and
the detection controller is configured to: collect the operating parameter of the steering assisting device, and determine, according to the operating parameter of the steering assisting device, whether the steering assisting device is normal.

8. The auxiliary steering system for an electric vehicle according to claim 7, wherein the steering assisting device sensor comprises:
a steering motor resolver sensor or a hydraulic sensor, wherein the steering motor resolver sensor is configured to detect a rotational speed of the steering assisting device, and the hydraulic sensor is configured to detect fluid pressure of the steering assisting device.

9. The auxiliary steering system for an electric vehicle according to claim 1, wherein the detecting circuit comprises:
a steering assisting device sensor, configured to detect an operating parameter of the steering assisting device; and
the detection controller is configured to: collect the operating parameter of the steering assisting device, and determine, according to the operating parameter of the steering assisting device, whether the steering assisting device is normal.

10. The auxiliary steering system for an electric vehicle according to claim 9, wherein the steering assisting device sensor comprises:
a steering motor resolver sensor or a hydraulic sensor, wherein the steering motor resolver sensor is configured to detect a rotational speed of the steering assisting device, and the hydraulic sensor is configured to detect fluid pressure of the steering assisting device.

11. The auxiliary steering system for an electric vehicle according to claim 9, wherein the detecting circuit comprises:
a rack displacement sensor, installed on the rack and configured to: monitor a movement amount of the rack and send the movement amount of the rack to the detection controller; and
a steering wheel torque angle sensor, configured to detect the steering wheel torque signal and the direction signal.

12. The auxiliary steering system for an electric vehicle according to claim 10, wherein the detecting circuit comprises:

a rack displacement sensor, installed on the rack and configured to: monitor a movement amount of the rack and send the movement amount of the rack to the detection controller; and a steering wheel torque angle sensor, configured to detect the steering wheel torque signal and the direction signal.

13. An auxiliary steering method for an electric vehicle, wherein the electric vehicle comprises a motor controller and a motor, and the method comprises:

continuously detecting whether a steering assisting device of the electric vehicle is normal, until the steering assisting device is abnormal; and when the steering assisting device of the electric vehicle is abnormal, controlling a drive rack of an aligning motor of the electric vehicle to drive wheels of the electric vehicle to align, and sending a steering malfunction signal, a steering wheel torque signal, and a direction signal; and controlling, by using the motor controller according to the steering malfunction signal, the steering wheel torque signal, and the direction signal, the motor to increase a drive torque of an outer front wheel of the vehicle, brake an inner rear wheel of the vehicle, and stop driving an inner front wheel and an outer rear wheel of the vehicle.

14. The auxiliary steering method for an electric vehicle according to claim 13, wherein the step of controlling, by using the motor controller according to the steering malfunction signal, the steering wheel torque signal, and the direction signal, the motor to increase a drive torque of an outer front wheel of the vehicle, brake an inner rear wheel of the vehicle, and stop driving an inner front wheel and an outer rear wheel of the vehicle comprises:

determining, according to the steering wheel torque signal, whether a steering wheel torque is greater than a first predetermined steering wheel torque; and when the steering wheel torque is equal to or less than the first predetermined steering wheel torque, obtaining, by the vehicle controller, an increased drive torque of the outer front wheel of the vehicle and a brake torque of the inner rear wheel of the vehicle, and controlling, by using the motor controller according to the increased drive torque of the outer front wheel of the vehicle and the brake torque of the inner rear wheel of the vehicle, the motor to drive the outer front wheel and brake the inner rear wheel, wherein the increased drive torque corresponds to the steering wheel torque; or when the steering wheel torque is greater than the first predetermined steering wheel torque, obtaining, by the vehicle controller, an increased drive torque of the outer front wheel of the vehicle and a brake torque of the inner rear wheel of the vehicle, and controlling, by using the motor controller according to the increased drive torque of the outer front wheel of the vehicle and the brake torque of the inner rear wheel of the vehicle, the motor to drive the outer front wheel and brake the inner rear wheel, wherein the increased drive torque corresponds to the first predetermined steering wheel torque.

15. The auxiliary steering method for an electric vehicle according to claim 14, wherein the step of controlling, by using the motor controller according to the steering malfunction signal, the steering wheel torque signal, and the direction signal, the motor to increase a drive torque of an outer front wheel of the vehicle, brake an inner rear wheel of the vehicle, and stop driving an inner front wheel and an outer rear wheel of the vehicle comprises:

when the steering wheel torque is equal to or less than the first predetermined steering wheel torque, obtaining a turning radius of the vehicle according to the steering wheel torque signal, determining whether the turning radius of the vehicle is less than a predetermined turning radius, and determining whether the steering wheel torque is greater than a second predetermined steering wheel torque; and when the turning radius of the vehicle is greater than or equal to the predetermined turning radius and the steering wheel torque is equal to or less than the second predetermined steering wheel torque, controlling, by the vehicle controller by using the motor controller, the motor to increase the drive torque of the outer front wheel of the vehicle and regeneratively brake the inner rear wheel of the vehicle; or when the turning radius of the vehicle is less than the predetermined turning radius and the steering wheel torque is greater than the second predetermined steering wheel torque, controlling, by the vehicle controller by using the motor controller, the motor to increase the drive torque of the outer front wheel of the vehicle and reversely drive the inner rear wheel of the vehicle;

wherein
the second predetermined steering wheel torque is less than the first predetermined steering wheel torque.

16. The auxiliary steering method for an electric vehicle according to claim 15, wherein the increased drive torque of the outer front wheel of the vehicle and the brake torque of the inner rear wheel of the vehicle satisfy the following relational formula:

$$\Delta T_{F1} - \Delta T_{R1} \geq T_{F1} + T_{F2} + T_{R1} + T_{R2};$$

wherein $\Delta T_{F1}$ is the increased drive torque of the outer front wheel of the vehicle, $\Delta T_{R1}$ is the brake torque of the inner rear wheel of the vehicle, $T_{R1}$ is a drive torque of the outer front wheel of the vehicle before a steering malfunction of the vehicle; $T_{F2}$ is a drive torque of the inner front wheel of the vehicle before the steering malfunction of the vehicle, $T_{R1}$ is a drive torque of the inner rear wheel of the vehicle before the steering malfunction of the vehicle; and $T_{R2}$ is a drive torque of the outer rear wheel of the vehicle before the steering malfunction of the vehicle.

17. The auxiliary steering method for an electric vehicle according to claim 13, wherein the step of detecting whether a steering assisting device of the electric vehicle is normal comprises:

detecting an operating parameter of the steering assisting device of the electric vehicle; and collecting the operating parameter of the steering assisting device, and determining, according to the operating parameter of the steering assisting device, whether the steering assisting device is normal.

18. The auxiliary steering method for an electric vehicle according to claim 17, wherein the step of detecting whether a steering assisting device of the electric vehicle is normal comprises:

detecting a rotational speed of the steering assisting device or detecting fluid pressure of the steering assisting device.

19. The auxiliary steering method for an electric vehicle according to claim 17, wherein the step of controlling a drive rack of an aligning motor of the electric vehicle to drive wheels of the electric vehicle to align comprises:

monitoring a movement amount of the rack, sending the movement amount of the rack, and detecting the steering wheel torque signal and the direction signal.

20. An electric vehicle, comprising the auxiliary steering system for an electric vehicle according to claim 1.

* * * * *